United States Patent
Bremer

(10) Patent No.: US 6,320,879 B1
(45) Date of Patent: Nov. 20, 2001

(54) COMMUNICATION SYSTEM AND METHOD FOR INTERLEAVING OR TRANSMISSION OF TELEPHONE RINGS AND DATA

(75) Inventor: Gordon Bremer, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/039,811

(22) Filed: Mar. 16, 1998

Related U.S. Application Data

(60) Provisional application No. 60/039,352, filed on Mar. 18, 1997.

(51) Int. Cl.$^7$ .................................................. H04J 1/02
(52) U.S. Cl. .......................... 370/493; 370/494; 370/495; 370/528; 379/93.28; 379/93.31
(58) Field of Search ................................. 370/352, 356, 370/433, 435, 493, 494, 495, 484, 485, 522, 526, 528; 379/31, 93.09, 93.14, 93.06, 197, 373, 93.28, 93.31, 93.32

(56) References Cited

U.S. PATENT DOCUMENTS

| | | | |
|---|---|---|---|
| 4,757,495 | * | 7/1988 | Decker et al. ................... 370/477 |
| 4,975,952 | * | 12/1990 | Mabey et al. ..................... 380/49 |
| 5,036,518 | * | 7/1991 | Tseung ............................ 714/748 |
| 5,371,731 | * | 12/1994 | Pratt et al. ........................ 370/216 |
| 5,493,609 | * | 2/1996 | Winseck, Jr. et al. ............. 379/96 |
| 5,724,358 | * | 3/1998 | Headrick et al. ................. 370/418 |
| 5,745,502 | * | 4/1998 | Khayrallah et al. .............. 714/751 |
| 5,799,064 | * | 8/1998 | Sridhar et al. .................... 375/222 |
| 5,841,840 | * | 11/1998 | Smith et al. .................... 379/93.01 |
| 5,848,150 | * | 12/1998 | Bingel ............................. 379/399 |
| 5,878,120 | * | 3/1999 | O'Mahony ..................... 379/93.09 |
| 5,883,893 | * | 3/1999 | Rumer et al. .................... 370/395 |
| 5,940,405 | * | 8/1999 | Sakuma .......................... 370/468 |
| 5,982,774 | * | 11/1999 | Foladare et al. ................. 370/401 |
| 5,982,779 | * | 11/1999 | Krishnakumar et al. ......... 370/447 |

* cited by examiner

Primary Examiner—Seema S. Rao
Assistant Examiner—Saba Tsegaye
(74) Attorney, Agent, or Firm—Scott A. Horstemeyer; Thomas, Kayden, Horstemeyer & Risley

(57) ABSTRACT

A telephone communication system is implemented to enable data communication and ring signaling to coexist on a subscriber loop. The communication system transmits data during the silence intervals of a ringing cadence and withholds the transmission of data during the occurrence of a ring signal. To ensure the transmission of reliable data, the communications system allows ring signals to occur and retransmits any interrupted data during the silence intervals between the ring signals. In another embodiment, the transmission of reliable data is ensured by delaying the ring signals until the data currently being transmitted is successfully and reliably received. Accordingly, in either embodiment, the reliability of data communication during the occurrence of a ringing cadence is preserved, and, therefore, data communication is allowed to coexist with ring signaling over a subscriber loop.

19 Claims, 3 Drawing Sheets

COMMUNICATION SYSTEM AND METHOD FOR INTERLEAVING OR TRANSMISSION OF TELEPHONE RINGS AND DATA

CROSS REFERENCE TO RELATED APPLICATION

This document claims priority to and the benefit of the filing date of copending provisional application entitled INTERLEAVING TRANSMISSIONS OF TELEPHONE RINGS AND DATA, assigned Ser. No. 60/039,352, and filed on Mar. 18, 1997, and is hereby incorporated by reference.

FIELD OF THE INVENTION

The present invention generally relates to telephony and data communication and, in particular, to a system and method for concurrently communicating digital data and a telephone ringing cadence to facilitate the transfer of information within a telephone subscriber loop by interleaving the transmission of telephone rings and the transmission of digital data.

BACKGROUND OF THE INVENTION

In data communications over a local telephone subscriber loop where simultaneous or alternating plain old telephone system (POTS) services are present, both digital data and ring signals are transmitted over the same transmission lines. Even though known methods attempt to make the data communications and the POTS communications independent via techniques such as frequency division multiplexing, reliable independence is impractical to achieve. The initiation of a ring signal is unpredictable and will typically cause data transmission errors and disrupt data transmission from the beginning of the ringing cadence, during the ringing cadence, and at least for some duration after cessation of the ringing cadence. Moreover, telephone ring interruption may cause loss of a digital data session due to the long communication interruption.

Some prior art systems have the capability of retransmitting data to a remote modem when communication errors occur. However, in these systems, the remote modem sends a notification to the transmitting modem to indicate that a reception has occurred and to request a retransmission. However, due to the largest and relatively long disturbance of a ringing signal, such notification is often not received by the transmitting modem when a ringing signal is causing the communication error.

Moreover, in some applications where telephone rings occur often, data operation may become impractical due to the frequency of telephone ring interruption. While it is possible to attempt to make the digital data path and the simultaneous POTS path mutually independent, for example, via POTS-splitter filters, this is often practically impossible due to the extremely large amplitude of the interfering signals with respect to the data signals. Therefore, for concurrent digital data communication and POTS communication (where digital data communication may be interrupted from time to time by ring signal requests for POTS service), sustained digital data communication is often not possible during the telephone ringing cadence associated with a request for POTS service.

Thus, a heretofore unaddressed need exists in the industry for providing a system and method for interleaving the transmission of telephone rings and digital data.

SUMMARY OF THE INVENTION

The present invention overcomes the inadequacies and deficiencies of the prior art as discussed herein. The present invention provides for a communication system and method for enabling the reliable concurrent transmission of POTS and digital data in the presence of disturbances such as telephone ringing signals.

The communication system and method utilize a data transmitter and a data receiver. The data transmitter is preferably configured to detect a ring signal, to stop the transmission of any digital data (if any such transmission exists), and to delay and store any desired transmission of digital data until the ring signal has ceased. After the cessation of the interrupting ring signal, the data transmitter preferably retransmits the digital data interrupted by the ring signal (if such interruption occurred) before resuming normal transmission operation. The data receiver is preferably configured to receive the transmitted data, to discard any data interrupted by the ring signal, and to process uninterrupted transmitted data.

In accordance with another feature of the present invention, the retransmitted data may include a header to indicate that the data being transmitted is a retransmission of a previously interrupted data signal. The transmission of this header may prompt the data receiver to discard the data signal received prior to the transmission of the header.

In accordance with another embodiment of the present invention, the data transmitter may be configured to delay the ring signal rather than to allow the ring signal to interrupt the data signal. In this regard, the data transmitter is configured to delay the ring signal when a ring request is received while the data transmitter is transmitting the data signal. The data transmitter ensures that the data signal is successfully transmitted by waiting until the data signal is reliably received by the data receiver before permitting the ring signal to occur.

The communication system and method of the present invention have many advantages, a few of which are delineated hereafter, as examples.

An advantage of the communication system and method is that they provide for the transmission of data signals during the intervals of silence in a ringing cadence. This provides faster and more efficient communications by allowing the concurrent transmission of a ringing cadence and data signals.

Another advantage of the telephone communication system and method is that they provide for elimination of digital data loss when a digital data communication session is interrupted by a ring signal. Such a scheme enhances the reliability of digital data communications over a subscriber loop.

Another advantage of the telephone communication system and method is that interruptions of a transmission of a data signal by a ring signal can be prevented, thereby ensuring the accuracy of the digital data signal.

Other features and advantages of the invention will become apparent to one skilled in the art upon examination of the following drawings in the detailed description. It is intended that all such additional features and advantages be included herein within the scope of the invention, as is defined by the claims.

BRIEF DESCRIPTION OF THE DRAWINGS

The invention can be better understood with reference to the following drawings. The elements of the drawings are not necessarily to scale, emphasis instead being placed upon clearly illustrating principals of the invention. Furthermore, like reference numerals designate corresponding parts throughout the several views.

DETAILED DESCRIPTION OF THE PREFERRED EMBODIMENTS

Figure 1:
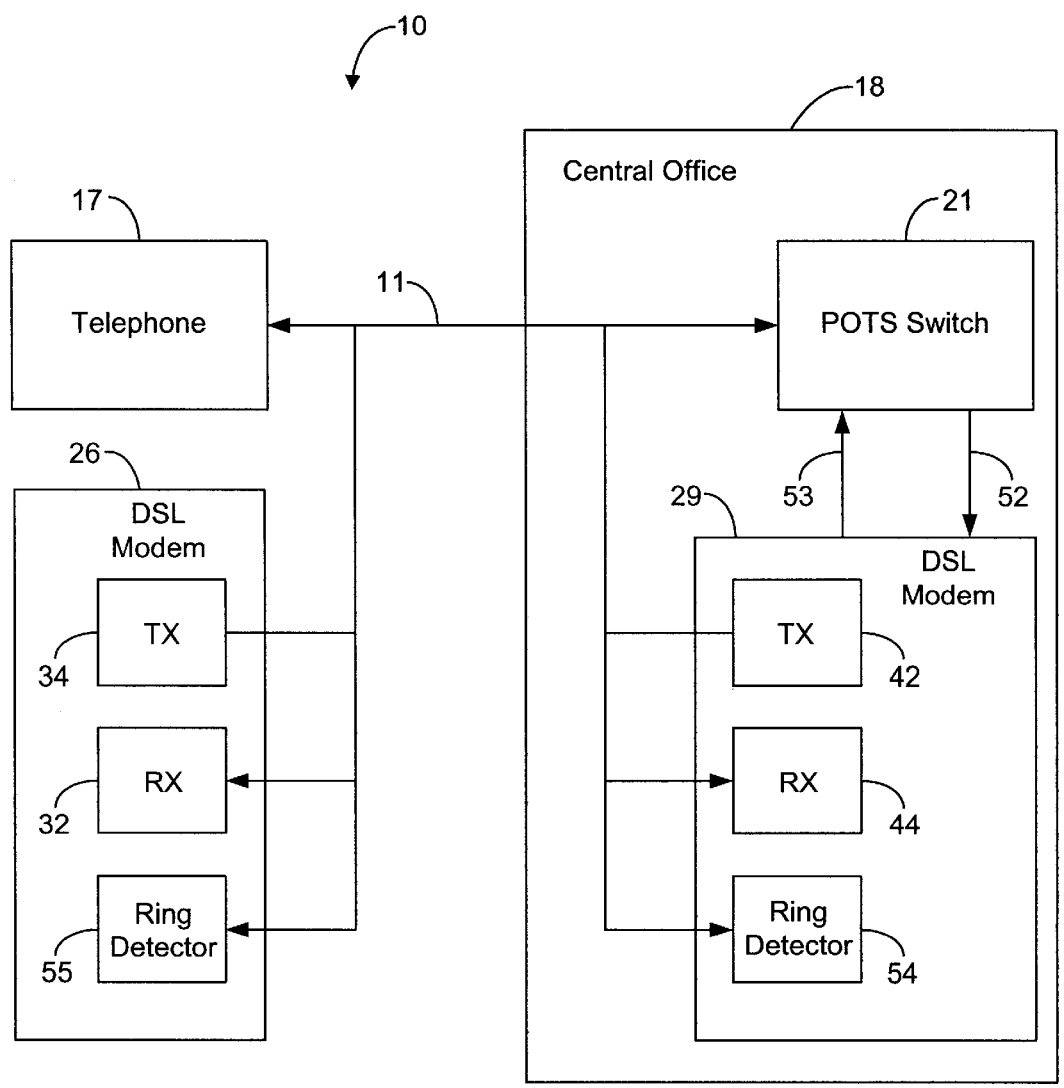
FIG. 1 is a block diagram illustrating implementation of a subscriber loop communication system in accordance with the present invention.

A telephone communication system 10 in accordance with the present invention is configured to operate over subscriber line 11 as depicted in FIG. 1. Telephone signals are communicated between a telephone 17 and a central office 18 associated with a telephone networking system such as the public switched telephone systems (POTS). Within central office 18 is a POTS switch 21 that transmits and receives the telephone signals which include ringing signals transmitted from POTS switch 21. Data is communicated over subscriber loop 11 between a remote digital subscriber line (DSL) modem 26 to DSL modem 29 located at central office 18. The data communications between DSL modems 26 and 29 may occur simultaneously (duplex), or may be alternating (halfduplex), and only one or the other may in fact be present (simplex). The data and telephone signals can occur concurrently on subscriber line 11, and independence between the data and telephony communications can be attempted by frequency division multiplexing wherein the telephony signals occupy the frequency band between 0 and 4000 Hertz (Hz) and the data signals occupy the frequency band above 8000 Hz, for example. The degree of achieved independence is dependent on controllable factors such as the filtering used to accomplish the frequency division multiplexing and uncontrollable factors such as the couplings between the POTS and the data at points where filtering cannot be effective. With regard to the description above, any combination of additional telephone devices 17 or similar terminating POTS devices such as dial modems are possible, and more than one DSL modem 26 also is possible.

As depicted by FIG. 1, DSL modem 26 includes a data transmitter to transmit digital data from DSL modem 26 and a data receiver to receive digital data from subscriber line 11. Furthermore, DSL modem 29 includes a data transmitter 42 to transmit digital data from DSL modem 29 and a data receiver 44 to receive digital data from subscriber line 11. For the purposes of the present invention, a "data transmitter" is any device or collection of devices in a modem which controls and implements the transmission of data from the modem, and a "data receiver" is any device or collection of devices in a modem which receives and processes the data transmitted from a data transmitter.

As can be further seen by reference to FIG. 1, POTS signals and data signals share the same communication channel 11. This sharing can cause problems due to the occurrence of very large amplitude POTS signals during POTS call establishments, examples being ringing and ring-trip (wherein the ringing signal is abruptly terminated by an off-hook termination). Such call establishment signals have amplitudes that may be one-hundred times larger than the POTS signals and DSL signals used during normal communication and may have frequency content that exceeds the normal POTS band and intrudes on the DSL band.

In particular, the occurrence of telephone rings can cause data errors when data is being communicated between DSL modems 26 and 29. Usually, the telephone rings occur as a part of a ringing cadence which is typically a repetitive cycle of about one second of ringing followed by about three seconds of silence which repeats until telephone 17 goes off hook or the ringing is terminated. The occurrence of a ringing cadence may result in the loss of data when the ringing cadence is allowed to interrupt a data session between DSL modems 26 and 29. In applications involving frequent telephone rings, data communication may be impractical if steps are not taken to ensure the reliability of the data communicated between DSL modems 26 and 29.

First Embodiment

The data communication system 10 of the present invention enables the correction of any data erred by a ring or a ring-TRIP signal and enables the communication of data during the silent intervals of a ringing cadence, thereby allowing the communication of data during the occurrence of a ringing cadence. With reference to FIG. 1, the communication system 10 of the first embodiment of the present invention preferably provides for the detection of a ring signal or a ring request at data transmitter 42. A "ring request" is a signal transmitted from POTS switch 21 to modem 29 via connection 52 that indicates a ring is about to occur. DSL modem 29 is configured to detect the occurrence of a ring signal by detecting a ring request via line 52 and/or by detecting the ring signal via ring detector 54 which is any suitable device capable of detecting a ring signal. Therefore, it is possible for DSL modem 29 to detect a communications error due to the occurrence of a ring signal without receiving a notification from DSL modem 26.

In response to the detection of an interrupting ring signal or ring request, data transmitter 42 is configured to cease any data transmission that may be occurring. If a data signal being transmitted is interrupted by the ring signal, then data transmitter 42 is designed to store the interrupted signal by techniques well known in the art. Data transmitter 42 is then designed to delay the transmission of any data signals until the interrupting ring signal has ceased. It may be necessary for data transmitter 42 to store data by methods well known in the art during this delay in order to prevent the loss or overrun of data. Once data transmitter 42 detects that the interruption has ceased, data transmitter 42 is designed to begin transmitting data again.

If a data signal was not interrupted by the occurrence of the ring signal (i.e., data transmitter 42 was not transmitting at the time of ring detection), then data transmitter 42 is preferably configured to continue normal transmission of data signals when necessary once the ring signal has ceased. However, if the ring signal interrupted the transmission of a data signal, then data transmitter 42 is preferably configured to retransmit the interrupted data signal upon the cessation of the ring signal before continuing the normal transmission of data signals. It is preferable to include a header on this retransmitted data to indicate to data receiver 32 that the transmitting signal is a retransmission of a previously interrupted data signal. As used herein, a header can be any sequence of particular data values recognizable by data receiver 32.

Data receiver 32 is designed to receive the data transmitted by data transmitter 42. If the occurrence of the ring signal did not interrupt a data transmission by data transmitter 42, then data receiver 32 is preferably designed to receive the transmitted data from data transmitter 42 and to process this data for use by DSL modem 26. However, if the occurrence of the ring signal interrupted a data transmission, then data receiver 32 is preferably designed to detect this interruption. Data receiver 32 can be configured to detect the interruption of a data signal either by having a ring detector 55 to detect the occurrence of a ring signal or by recognizing the header preferably attached to the first data signal transmitted after the cessation of the ring signal. When data receiver 32 recognizes that the interruption of a data signal has occurred, data receiver 32 discards the interrupted signal and anticipates the retransmission of the interrupted signal which it receives upon cessation of the interrupting ring signal.

When data receiver 32 detects the retransmission header to recognize an interruption, it is desirable for data receiver 32 to store received data before processing the received data until other data is received that does not contain a retransmission header. By doing so, data receiver 32 ensures that only valid data is processed.

It should be noted that the system 10 outlined hereinabove for data transmission during the occurrence of a ringing cadence is not limited to the situation where data transmitter 42 is a central office 18 transmitter and data receiver 32 is a remote modem 26 receiver. It should be obvious to one ordinarily skilled in the art that data transmitter 34 of remote DSL modem 26 and data receiver 42 of DSL modem 29 can be configured in the same way as data transmitter 42 and data receiver 32, respectively. By doing so, transmission from DSL modem 26 to DSL modem 29 during occurrence of a ringing cadence is enabled.

Second Embodiment

In a second embodiment of the present invention, modem 29 is preferably configured to notify, via signal 53, POTS switch 21 to delay ringing until such time that data communication has ceased. Unlike the first embodiment, modem 29 is preferably designed to delay the ring signal until data signals currently in the process of being transmitted have been completely and reliably received. In this regard, modem 29 may use any suitable conventional technique to determine whether all transmitted data has been reliably received. Once the current data signals have been successfully received, then POTS switch 21, in response to signal 53, allows the ring signal to occur. By delaying the occurrence of the ring signal until the current data signals have been reliably received, interference of ring signals and data signals is prevented. Accordingly, there is no need to retransmit data signals since all such signals have been reliably received by data receiver 32.

In the case when data transmitter 42 is not in the process of transmitting data upon the detection of the ring request, the ring signal is immediately allowed to occur. Once the ring signal has ceased, data transmitter 42 is preferably designed to begin data transmissions again until the detection of the next ring request. In this way, data communication and telephone ringing are interleaved across the same connections.

It should be noted that the second embodiment of the present invention may be used with communication between data transmitter 34 of modem 26 and data receiver 44 of modem 29. However, since modem 29 is preferably designed to control the ring request signal, modem 29 is preferably configured to detect when data transmitter 34 of modem 26 is transmitting. When modem 29 detects that data transmitter 34 of modem 26 is not transmitting at the occurrence of a ring request detection, then modem 29 merely allows the ring signal to proceed via signal 53. At this time, modem 26 detects the ring signal and waits for the ring signal to cease before transmitting any data.

When modem 29 detects that data transmitter 34 of modem 26 is transmitting when a ring request is detected, then modem 29 is preferably designed to inhibit the ring request until the transmitted data is reliably received by data receiver 44. Once modem 29 determines that the transmitted data is reliably received by data receiver 44, modem 29 is designed to allow the ring signal to occur, and data transmitter 34 is preferably designed to wait to transmit any further data until modem 26 detects the cessation of the ring signal. As a result, data communication and ring signaling are interleaved across a user subscriber line 11.

OPERATION

The preferred use and operation of the communication system 10 and associated methodology are described hereafter.

First Embodiment

Figure 2:
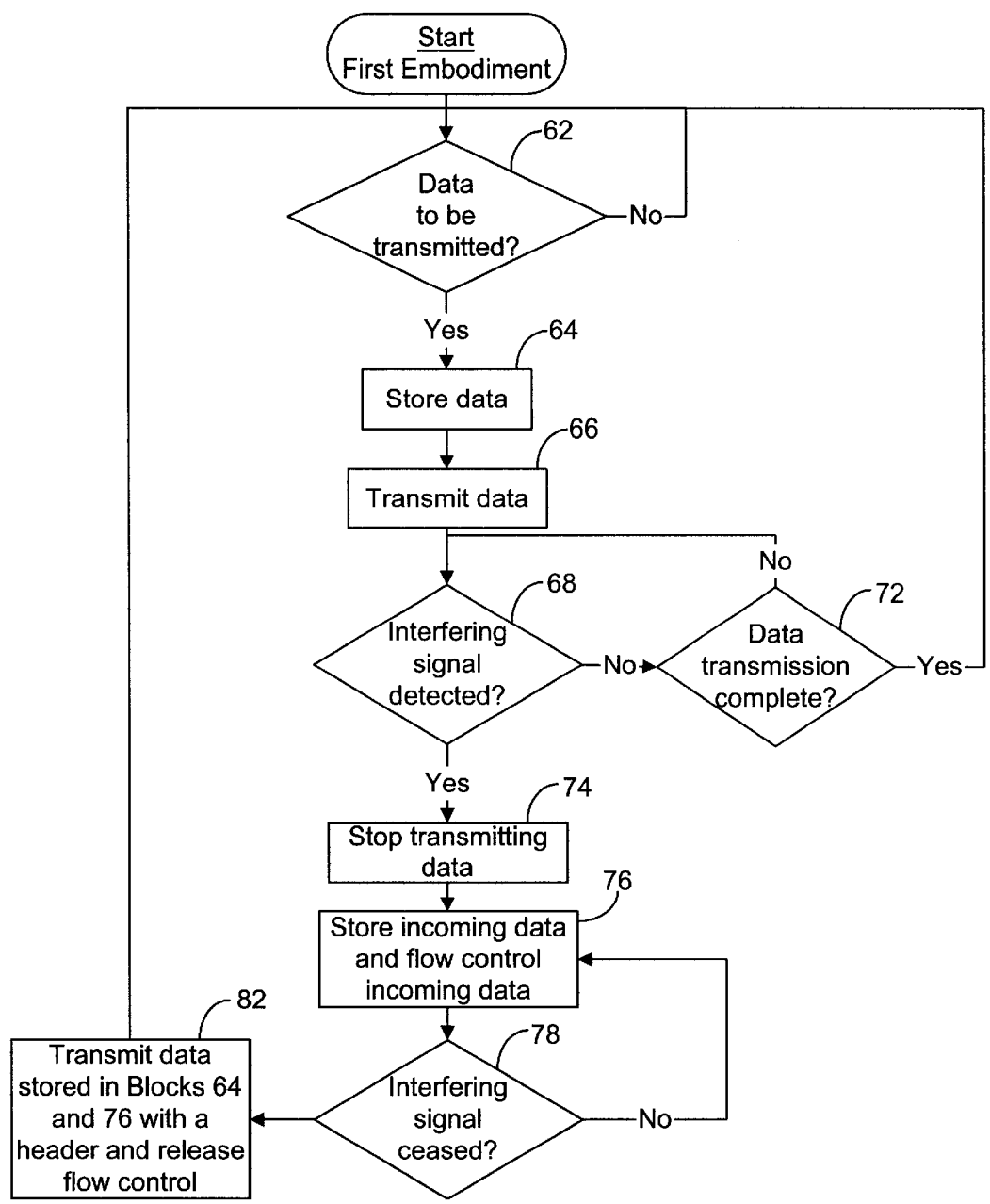
FIG. 2 is a flow chart illustrating the preferred architecture, functionality, and operation of the data transmitter in accordance with a first embodiment of the present invention.

The operation and functionality of the first embodiment of the present invention are depicted in FIG. 2. Blocks 62–72 show that the present invention transmits data normally with the exception that data being transmitted is also being stored in transmitter 42 in anticipation of a need to retransmit this data in the event that it is determined that transmission was likely erred due to disrupting signals. Block 68 may detect an interfering signal by several means including the detection of the amplitudes of signals which exceed those normally transmitted or received by modem 29.

If a disrupting signal is detected in block 68, as noted in block 74, transmitter 42 stops transmission. Block 76 shows that modem 29, then continues to store incoming data. Although not necessary for implementation of the present invention, modem 29 (in block 76) also enables flow control on the incoming data in order to ensure that data overflow does not occur. As shown in block 78, modem 29 stays in the state of block 76 until the interfering signal ceases.

As noted in Block 82, when the interfering signal is absent, transmitter 42 retransmits the stored data and any data not flow controlled and preferably adds information suitable for receiver 32 to identify such data as a retransmission.

Note that most practical data transmission protocols limit the amount of data expected to be transferred by placing data into packets or cells. Thus, the amount of data stored above is not limitless when the present invention is utilized in the context of most current protocols.

It should be noted that the functionality of FIG. 2 is the same when DSL modem 26 is the transmitting device and DSL modem 29 is the receiving device.

Second Embodiment

Figure 3:
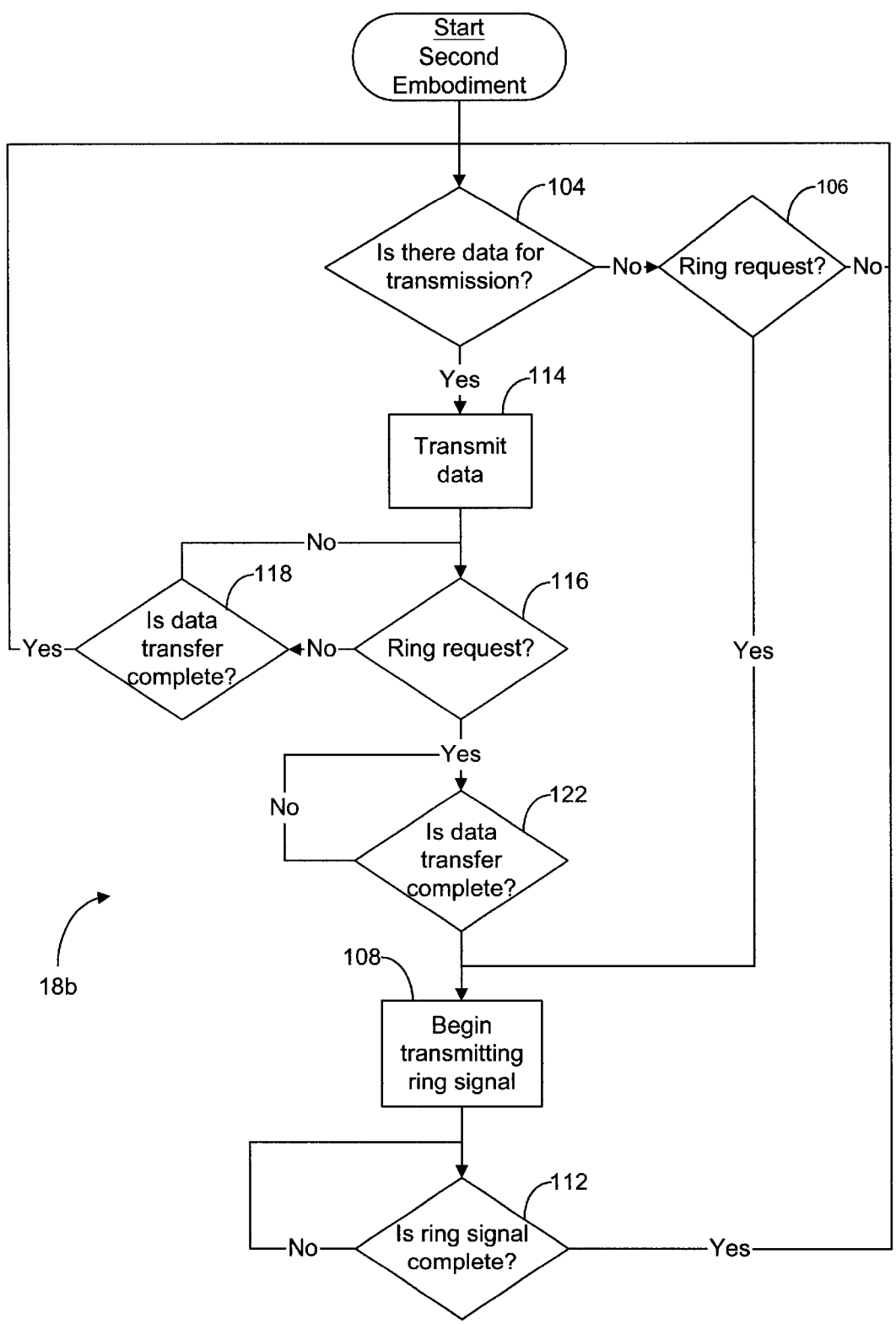
FIG. 3 is a flow chart illustrating the preferred architecture, functionality, and operation of the data transmitter in accordance with a second embodiment of the present invention.

The operation and functionality of the second embodiment of the present invention are depicted in FIG. 3. Blocks 104 and 106 show that the present invention initially determines if there is data to be transferred or if there is a ring request. As indicated in blocks 106–112, if a ring request is detected prior to the detection of data, the ring signal is generated. Although not shown in FIG. 3, it may be necessary to store requested data transmissions that occur during the ring signal in order to prevent the loss or overrun of data. Once the ring signal ceases, the process of checking for data and ring requests is repeated as shown by block 112.

If the present invention detects that there is data to be transmitted, blocks 114–118 show that the data is transmitted from transmitter 42 until a ring request is detected or the data is completely transferred. If a ring request is detected before the data transfer is completed, then block 122 shows that the data is allowed to finish transmitting before any more steps are taken. Once it is ensured that the current data signals have been reliably transferred, blocks 108 and 112 show that the ring signal is enabled.

It should be noted that the functionality of FIG. 3 is the same when modem 26 of is transmitting to modem 29. However, it is modem 29 that controls block 108 of FIG. 3, in such a case. Therefore, when data transmitter 34 is not transmitting at the occurrence of a ring request, modem 29, having determined that modem 26 has ceased transmission, permits any ring request to proceed.

It should be further noted that data transmitter 34 is preferably configured not to transmit any data until data transmitter 42 signals modem 26 to do so. Accordingly, a "yes" from block 104 in FIG. 3 is not only dependent upon there being data in modem 26, but it also is dependent on there being an enabling signal from data transmitter 42.

Furthermore, when modem 26 is transmitting at the occurrence of a ring request, data transmitter 42 inhibits any ring request until the data is reliably received. Accordingly, data transmitter 42 performs the functionality of block 111 and 108 of FIG. 3.

In either embodiment of the communication system 10 of the present invention, data communication and ring signals are interleaved on a subscriber line 11. Both embodiments achieve this by transmitting data only in the silent intervals of a ringing cadence and by either insuring no interruption of a data transmission or by retransmitting any data signal which is interrupted.

It should be noted that the implementation of the present invention has been illustrated with an occurrence of a ring signal. However, the ring signal can be replaced with a ring-trip or other relatively large disturbance without departing from the principles of the present invention.

In concluding the detailed description, it should be noted that it will be obvious to those skilled in the art that many variations and modifications may be made to the preferred embodiments without substantially departing from the principals of the present invention. All such variations and modifications are intended to be included herein within the scope of the present invention, as set forth in the following claims.

Wherefore, the following is claimed:

1. A communication system for communicating across a communication connection to a remote communication device, comprising:
   a data signal communication device coupled to said communication connection, said data signal communication device configured to transmit data signals across said communication connection and to receive a plurality of ring signals that are indicative of an incoming call, said data signal communication device configured to detect an interruption of one of said data signals via one of said ring signals being communicated across said communication connection, said data signal communication device further configured to detect a cessation of said one ring signal and to retransmit said one data signal across said communication connection after said cessation and in response to a detection of said cessation by said data signal communication device, wherein said data signal communication device retransmits said one data signal between said one ring signal and another of said ring signals.

2. The system of claim 1, wherein said data signal communication device detects said interruption by detecting a ring request.

3. The system of claim 1, wherein said data signal communication device includes a ring detector coupled to said communication connection, said ring detector configured to detect said ring signal while said ring signal is being transmitted over said communication connection.

4. The system of claim 1, wherein said retransmitted data signal includes a header indicating that said retransmitted data signal is a retransmission.

5. The system of claim 1, further comprising a data receiver configured to receive and process said retransmitted data signal and configured to receive and to discard said one data signal interrupted by said ring signal.

6. A communication system, comprising:
   a digital subscriber line (DSL) modem coupled to a communication connection, said DSL modem configured to transmit a data signal across said communication connection and to detect an occurrence of a ring signal that interrupts said data signal while said data signal is being communicated across said communication connection, said DSL modem further configured to retransmit said data signal across said communication connection in response to a detection by said DSL modem of an absence of said occurrence of said ring signal, wherein said DSL modem retransmits said data signal between successive ring signals of a ringing cadence occurring on said communication connection.

7. The system of claim 6, further comprising a second DSL modem configured to receive said retransmitted data signal, to detect said occurrence of said ring signal and to discard, in response to a detection of said occurrence of said ring signal, digital data received by said second DSL modem, wherein said discarded digital data corresponds with said retransmitted data signal.

8. The system of claim 6, wherein said DSL modem is further configured to include a header in said retransmitted data signal, said header indicating that said retransmitted data signal is a retransmission.

9. The system of claim 8, further comprising a second DSL modem configured to receive said retransmitted data signal and to discard data based on said header.

10. A communication system, comprising:
    a communication connection coupled to a remote modem;
    a digital subscriber line (DSL) modem coupled to said communication connection, said DSL modem configured to detect an occurrence of a ring request and to generate an enabling signal automatically in response to a determination that a data signal being transmitted across said communication connection during said occurrence of said ring request is reliably communicated to said remote modem; and
    a ring signal transmitter coupled to said communication connection, said ring signal transmitter configured to transmit a ring signal across said communication connection in response to said enabling signal.

11. A communication method for communicating to a remote communication device, comprising the steps of:
    transmitting data signals to said remote communication device prior to an occurrence of a ring request;
    detecting said occurrence of said ring request;
    ensuring that each of said data signals transmitted in said transmitting step is reliably communicated to said remote communication device;
    transmitting a ring signal to said remote communication device;

automatically enabling said transmitting a ring signal step in response to said detecting step; and delaying said enabling step based on said ensuring step and until completion of said ensuring step.

12. A communication method for interleaving transmissions of telephone rings and of data, comprising the steps of:

transmitting a data signal across a communication connection;

detecting a plurality of ring signals that are indicative of an incoming call;

detecting an interruption of said data signal via one of said ring signals being communicated across said communication connection;

detecting a cessation of said one ring signal; and transmitting a retransmission of said data signal across said communication connection in response to said detecting a cessation step and between successive ring signals of said plurality of ring signals.

13. The method of claim 12, further including the step of indicating, via within said retransmission, that said retransmission includes data previously transmitted across said communication connection.

14. The method of claim 13, further including the step of discarding, in response to said data within said retransmission, data previously received from said communication connection.

15. A communication method for interleaving transmissions of telephone rings and data, comprising the steps of:

transmitting a data signal across a communication connection to a remote communication device;

detecting a ring request during said transmitting a data signal step;

determining, in response to said detecting step, whether said data signal has been reliably communicated to said remote communication device; and transmitting a ring signal across said communication connection in response to a determination in said determining step that said data signal has been reliably communicated to said remote communication device.

16. The method of claim 15, further comprising the step of delaying said ring signal in response to a determination in said determining step that said data signal has yet to be reliably communicated to said remote device.

17. A communication system for communicating to a remote communication device, comprising:

a communication connection;

a ring signal transmitter coupled to said communication connection, said ring signal transmitter configured to transmit a ring request in response to an incoming call and to receive an enabling signal, said ring signal transmitter further configured to transmit a ring signal across said communication connection in response to said enabling signal; and a data signal transmitter configured to transmit data signals across said communication connection, said data signal transmitter configured receive said ring request while transmitting at least one of said data signals across said communication connection, said data signal transmitter further configured to transmit said enabling signal to said ring signal transmitter in response to said ring request after ensuring that said at least one data signal has been reliably communicated.

18. The communication system of claim 17, wherein said data signal transmitter is further configured to cease transmission of said data signals in response to said ring request.

19. The communication system of claim 18, wherein said data signal transmitter is further configured to detect cessation of said ring signal and to initiate said transmission of said data signals in response to said cessation of said ring signal.

* * * * *